US007644596B2

(12) United States Patent
Ookahara et al.

(10) Patent No.: US 7,644,596 B2
(45) Date of Patent: Jan. 12, 2010

(54) METHOD OF MANUFACTURING A GLASS REFLECTOR

(75) Inventors: Makoto Ookahara, Gyoda (JP); Kyouichi Maseki, Gyoda (JP)

(73) Assignee: Iwasaki Electric Co., Ltd., Tokyo (JP)

( * ) Notice: Subject to any disclaimer, the term of this patent is extended or adjusted under 35 U.S.C. 154(b) by 743 days.

(21) Appl. No.: 11/312,432

(22) Filed: Dec. 21, 2005

(65) Prior Publication Data

US 2006/0158079 A1 Jul. 20, 2006

Related U.S. Application Data

(63) Continuation-in-part of application No. 10/344,557, filed as application No. PCT/JP01/07094 on Aug. 17, 2001, now abandoned.

(30) Foreign Application Priority Data

Aug. 17, 2000 (JP) ............................. 2000-247253

(51) Int. Cl.
*C03C 19/00* (2006.01)
*C03B 11/00* (2006.01)
*H01J 5/16* (2006.01)
*F21V 7/00* (2006.01)

(52) U.S. Cl. ................. 65/61; 65/66; 65/102; 313/110; 313/113; 362/296.01; 362/310; 362/341

(58) Field of Classification Search ..................... 65/66, 65/102, 305, 61, 68, 72, 315; 313/110, 111, 313/113, 118; 362/296, 571, 310, 341, 304
See application file for complete search history.

(56) References Cited

U.S. PATENT DOCUMENTS 3,891,421 A * 6/1975 Levin .......................... 65/107

(Continued)

FOREIGN PATENT DOCUMENTS

EP 0595412 5/1996

(Continued)

OTHER PUBLICATIONS

English Language Abstract of JP 2002-062586.
English Language Abstract of JP 11-265655.

*Primary Examiner*—Kahnh Nguyen
*Assistant Examiner*—Carson Gross
(74) *Attorney, Agent, or Firm*—Greenblum & Bernstein P.L.C.

(57) ABSTRACT

A short-arc discharge lamp capable of reducing the likelihood of cracks starting at an end face of a reflection mirror neck unit. Such cracks can be caused by heat generated from the discharge lamp. The short-arc discharge lamp includes a glass reflection mirror having a reflection surface of an even-order function on an inner surface thereof and formed by embossing. The short-arc discharge lamp is arranged with respect to an optical axis of the reflection mirror. A base of the discharge lamp is fixed to an insertion hole in a hollow neck unit formed in a bottom center of the reflection mirror. Furthermore, a base peripheral portion on the inner surface of the insertion hole in the hollow neck unit has a cylindrical shape with a narrow portion formed to extend from the cylindrical shape toward the reflection surface. Finally, an embossed portion extends from the narrow portion toward the reflection surface while diverging to contact the reflection surface.

5 Claims, 6 Drawing Sheets

U.S. PATENT DOCUMENTS

| | | | | |
|---|---|---|---|---|
| 3,985,535 | A * | 10/1976 | Bennett et al. | 65/61 |
| 3,997,318 | A * | 12/1976 | Takatoki et al. | 65/362 |
| 5,177,396 | A | 1/1993 | Gielen et al. | |
| 5,506,464 | A * | 4/1996 | Ooms | 313/113 |
| 5,548,182 | A | 8/1996 | Bunk et al. | |
| 6,211,616 | B1 | 4/2001 | Takeuti et al. | |
| 6,538,383 | B1 | 3/2003 | Takeuchi | |

FOREIGN PATENT DOCUMENTS

| | | |
|---|---|---|
| JP | 5 9181411 | 12/1984 |
| JP | 3-66150 | 6/1991 |
| JP | 3-106615 | 11/1991 |
| JP | 6-203806 | 7/1994 |
| JP | 1 1265655 | 9/1999 |
| JP | 2002-062586 | 2/2002 |

* cited by examiner

METHOD OF MANUFACTURING A GLASS REFLECTOR

CROSS-REFERENCE TO RELATED APPLICATIONS

The present application is a Continuation-in-Part of U.S. application Ser. No. 10/344,557, filed Apr. 11, 2003, now abandoned which is a U.S. National Stage Patent Application of PCT/JP01/07094 filed on Aug. 17, 2001, the contents of which is expressly incorporated by reference in its entirety. The present disclosure is also related to the subject matter contained in Japanese Patent Application No. 2000-247253, filed Aug. 17, 2000, the contents of which is expressly incorporated by reference in its entirety.

TECHNICAL FIELD OF USE

A present invention relates to a method of manufacturing a glass reflector used for the lamp unit of a light source apparatus.

BACKGROUND ART

Recently, a short arc discharge lamp has rapidly been spreading as a light source of a liquid crystal projector. Such a kind of lamp is used as a light source apparatus constructed by combining with a reflecting mirror having a reflective surface formed on the internal surface of the reflecting mirror as a paraboloid of revolution or an ellipsoid of revolution for collecting light to a liquid crystal panel. Moreover, such a light source apparatus is required to be more miniaturized and to have a higher efficiency as a light source apparatus for a mobile projector. Accordingly, various proposals for the downsizing of the light source apparatus and for utilizing the reflective surface of a reflecting mirror efficiently have been made.

U.S. Pat. No. 5,506,464 shows the lamp unit which consists of the reflector and discharge lamp for such a light source apparatus.

FIG. 5 shows the reflector 31 used for such a lamp unit. The reflector 31 has a hollow neck portion 33 for holding one of seal parts of a lamp formed in the bottom of the reflector body 32 which has a rotation ellipse surface that will be a reflective surface 31*a*. The inside surface 33*a* of the hollow neck portion 33 spreads toward a back opening.

As shown in FIG. 6 (*a*), this reflector 31 is manufactured by using the outer mould 34 and the inner mould 35. First, the glass gob G is put in outer mould 34. Second, the glass is pushed and extended by the inner mould 35.

As shown in FIG. 6(*b*), the glass G is filled up in the cavity 36 formed among outer mould 34 and inner mould 35 and the reflector body 32 is made. At this time, a partition 37 which separates the reflecting surface 31*a* and hollow neck portion 33 is formed between the top 35*a* of the inner mould 35 and the core 34*a* of the outer mould 34. Therefore, it is necessary to open the partition 37 and to form the lamp insertion hole 38.

In order to form the lamp insertion hole 38, as shown in FIG. 6 (*c*), the rotatable cylindrical grindstone 39 grinds the partition 37. Then, a reflective membrane is formed on the inner surface of the reflector body 32 by vapor deposition. As shown in FIG. 6 (*d*), such a mirror 31 has a narrowest portion 40 at the reflective surface side of the hollow neck portion 33. The narrowest portion 40 functions as a dam which prevents the outflow of the adhesives 52 which fix a lamp (refer to FIG. 5).

However, since the insertion hole 38 is opened by the grindstone, as shown in FIG. 6 (*d*), there are countless fine scratches on the inner surface of the hole 38. Therefore, when the reflector 31 was used for a lamp unit, a crack occurs at the reflective surface side of the hole 38 by high temperature of lamp, and finally, the reflector 31 will be broken. Since especially the opening edge 38*a* of the insertion hole 38 tended to be influenced of the heat of a lamp, the reflector 31 breaks very easily.

For removing scratches, from the past, the process of polishing by flame of burner 41 for finish of the inner surface of the insertion hole 38 had to be carried out further as shown by FIG. 7, so that the narrowest portion 40 with countless scratches becomes a smooth surface without any scratches. Thus manufacturing cost was increasing.

If a partition 37 was not formed, since it is not necessary to open the hole 38 by grindstone, there is not such a problem. Inventors made trial moulds which were designed so that tip 35*a* of the inner mould 35 and the top 34*b* of the core 34*a* of outer mould 34 are joined each other. And they tried to manufacture the reflector using the moulds. However, glass solidifies under cooling rapidly and a partition is formed, if the gap of tip 35*a* and top 34*a* is set to 1 mm or less while extending glass gob by the inner mould 35. Thereby, since tip 35*a* does not join to the top 34*a*, a reflector 31 can not be fabricated according to the design.

Therefore, the object of the present invention is as follows; no scratches by grindstone of narrowest portion on inner surface of insertion hole without the process of polishing by flame, when an insertion hole was opened in the partition of the reflector body by grindstone

DISCLOSURE OF THE INVENTION

The present invention is a method of manufacturing the reflector which has the hollow neck portion which fixes one end of a lamp to outside of the bottom along the reflector optic axis. This method comprises a molding process, a grinding process and a reflective membrane covering process. In the molding process, an inner mould and an outer mould are used. The inner mould forming an inner surface of reflector has a nipple at the point to form a dent falling toward a hollow neck portion at a smooth slope from the a bottom of a reflector. The outer mould forming an outer surface of reflector has a core projection facing to the nipple of inner mould to form a hollow neck portion. The molding process wherein glass-gob is put into the outer mould, the glass is pressed and extended by inner mould and filled in cavity between the outer mould and the inner mould.

The grinding process wherein grinding to open an insertion hole at a partition portion formed between the core projection of outer mould and the nipple of inner mould for passing to inner side of reflector from a hollow neck portion. When opening of the partition is carried out by grinding the inside of hollow neck portion, so that inner diameter of backside of hollow neck portion becomes larger than the outer diameter of nipple. The reflective membrane covering process wherein covering a inner surface of reflector body with reflective membrane after the said processes.

BEST MODE FOR PRACTICING THE INVENTION

In the following, a preferred embodiment will be described on the basis of the attached drawings.

Figure 3:
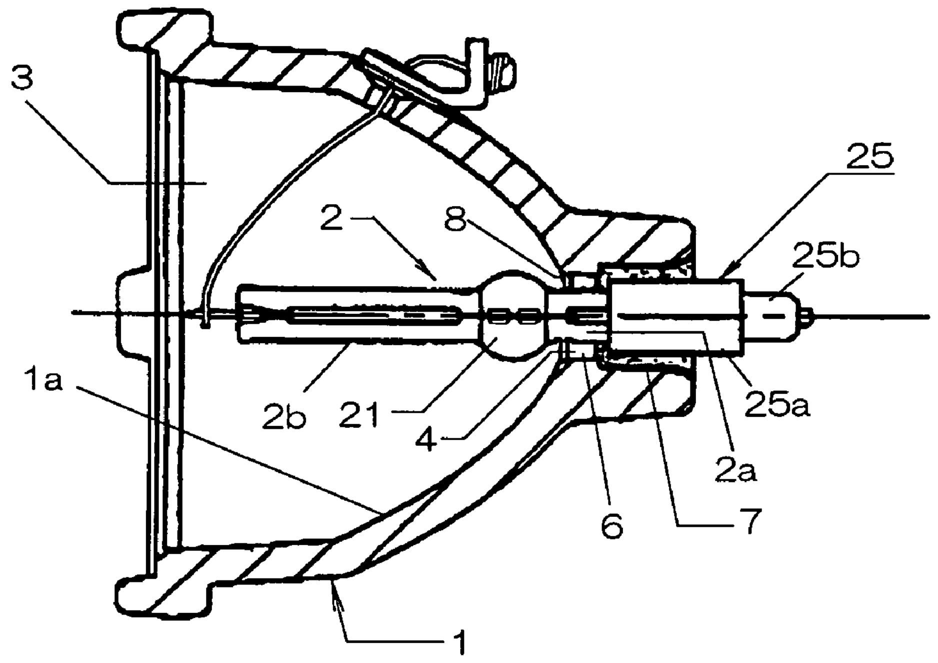
FIG. 3 is a sectional view of the lamp unit which used the reflector.

As shown in FIG. 3, the reflector 1 manufactured by the present invention is used for mounting the double end type short arc high-pressure discharge lamp 2. It is made of hard glass (the expansion coefficient thereof is $38\times10^{-7}$ cm/° C.). The reflective surface 1*a* shaped in a paraboloid of revolution is formed in the inside of a reflector 1. The insertion hole 4 which inserts a seal portion 2*a* of a lamp 2 is formed in the center of a bottom of reflector 1 at opposite side of the opening 3 by which the reflecting light of a lamp 2 is irradiated. And the hollow neck portion 5 in which a seal portion 2*a* is fixed extends toward the backside of the insertion hole 4. The narrowest portion 6 narrower than the hollow neck portion 5 is formed at insertion hole 4 at the reflective surface side of the hollow neck portion 5. This narrowest portion 6 functions as a dam which prevents the outflow of the adhesives 7 which fix seal portion 2*a* of a lamp 2 to the reflective surface 1*a*.

This reflector 1 is manufactured through a molding process, a grinding process (each process shown in FIG. 1), the reflective film covering process not shown in drawings.

Figure 1A:
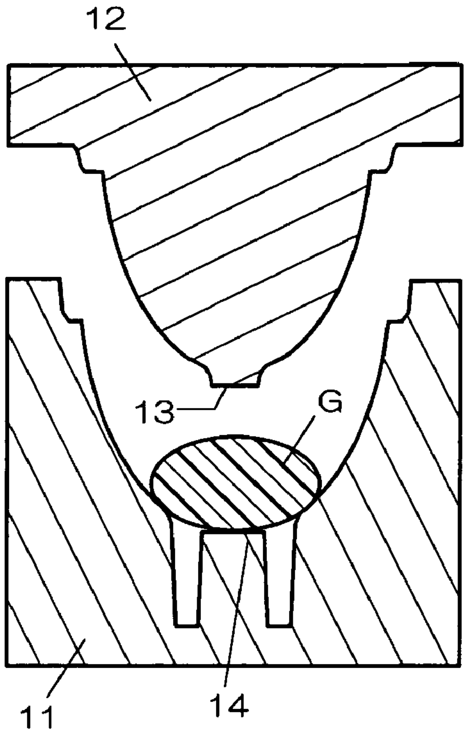
FIGS. 1(*a*)-1(*d*) are explanatory views showing an example of the reflector manufacture method concerning a present invention.
Figure 1B:
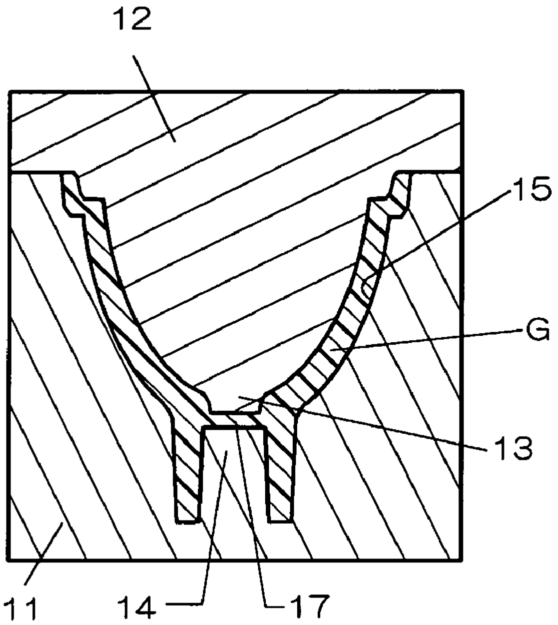
Figure 1C:
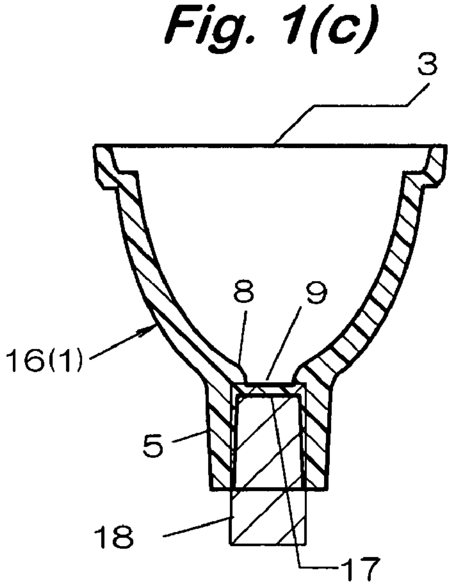
Figure 1D:
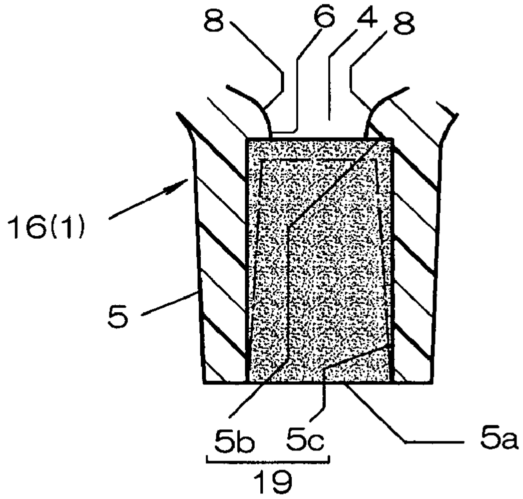
Figure 2:
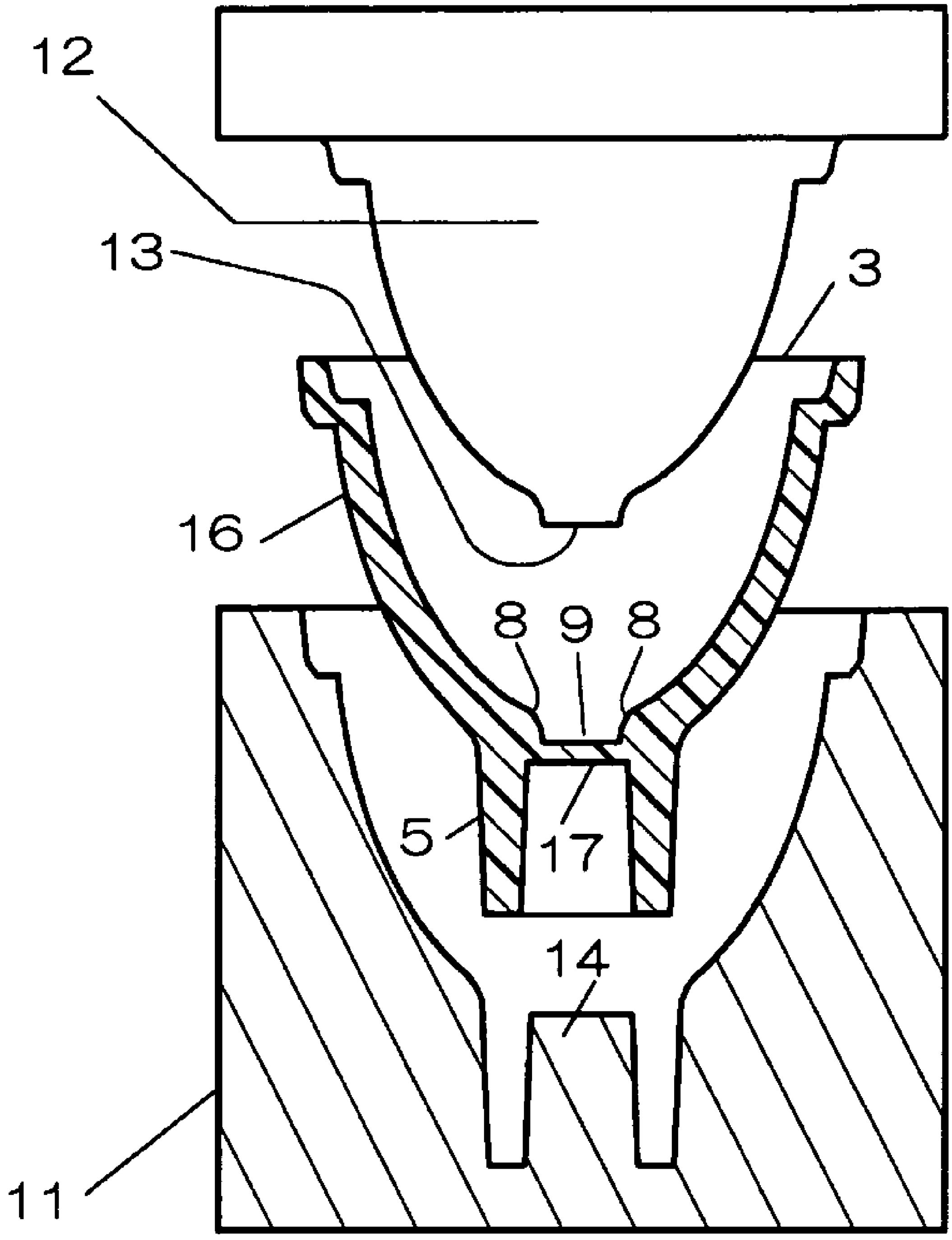
FIG. 2 is sectional view showing moulds and reflector

At the molding process, an outer mould 11 and an inner mould 12 shown in FIG. 2 are used. On the tip of the inner mould 12 which forms the inner surface of a reflector 1, the nipple 13 for forming the depression 9 which falls toward the hollow neck portion 5 with the smooth slope 8 from the bottom of a reflector 1 is projected. The diameter of the nipple 13 is equal to the inner diameter of the narrowest portion 6 of the insertion hole 4. At the Bottom of outer mould 11 which forms the outer surface of reflector 1, a core projection 14 to form a hollow neck portion 5 is projected toward the nipple 13 of inner mould 12.

In the molding process, glass-gob G is put into the outer mould 11 as shown in FIG. 1(*a*). The glass G is pressed and extended by inner mould 12 and filled in the cavity 15 between the outer mould 11 and the inner mould 12 as shown in FIG. 1(*b*), so that reflector body 16 is molded.

At the center of the inside bottom of the reflector body 16 brought out of moulds 11 and 12, the depression 9 which falls toward the hollow neck portion 5 with the smooth slope 8 is formed, as shown in FIGS. 1(*c*) and (*d*). Moreover, the partition portion 17 between the depression 9 and the hollow neck portion 5 is formed, since glass G is filled to a gap between the top 14*a* of core projection 14 and nipple 13.

Subsequently, in the grinding process, the partition portion 17 is opened by a rotating cylindrical grindstone 18. The diameter of this grindstone 18 is larger than the outer diameter of projection 13, and of course smaller than the outer diameter of the hollow neck portion 5. Therefore, the cylinder portion 19 with the inner diameter larger than a narrowest portion 6 is formed from back opening 5*a* of hollow neck portion 5 toward the narrowest portion 6 by grindstone 18, so that, the partition part 17 is removed and the insertion hole 4 is opened completely.

Thereby, a surface of narrowest portion 6 which is molded by the nipple 13 of the inner mould 12 is a molded surface without a scratch. It is difficult for the portion 19*a* to be influenced of heat, since the portion 19*a* at the reflective surface side of the scratched surface of cylinder portion 19 by grindstone 18 is formed in the backside of a narrowest portion 6. Moreover, it is also difficult for the portion 19*b* to be influenced of heat, since the gap is widened between the seal portion 2*a* of the lamp 2 and the portion 19*b*, which is formed at the back opening side of the scratched surface of the cylinder-portion 19 by grindstone 18.

After ending the molding process and the grinding process, in the reflective membrane covering process, the inner surface of the reflector body 16 is covered by a reflective membrane which is, for example, formed by vapor deposition of aluminum and becomes the reflective surface 1*a*, so that the reflector 1 is completed.

Figure 4:
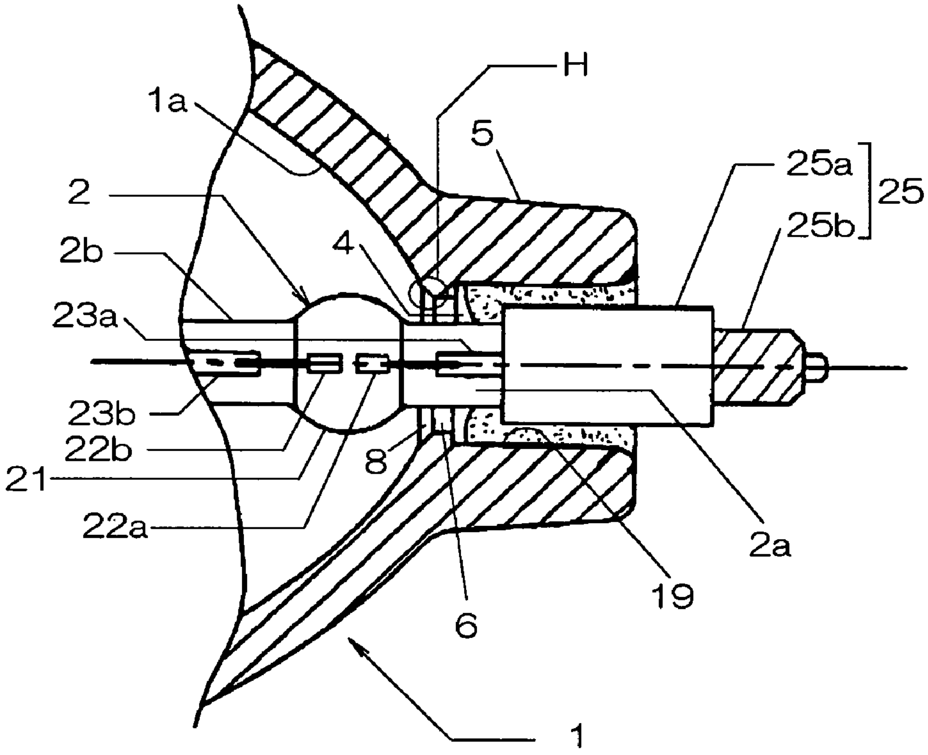
FIG. 4 is an enlarged sectional view of the main part of the lamp unit of FIG. 3.
Figure 5:
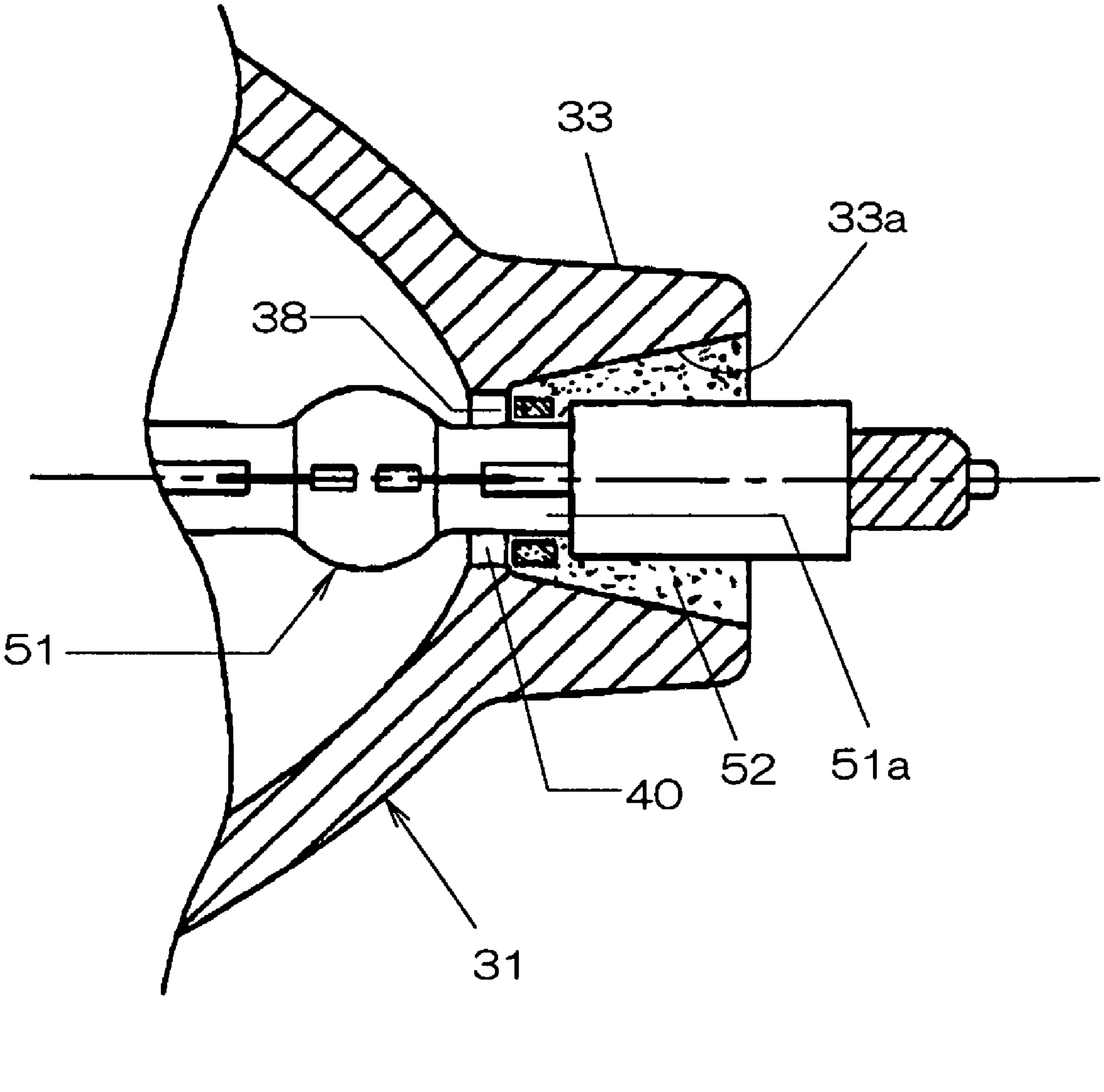
FIG. 5 (prior art)
FIG. 5 is an explanatory view showing a lamp unit which used conventional reflector.
Figure 6A:
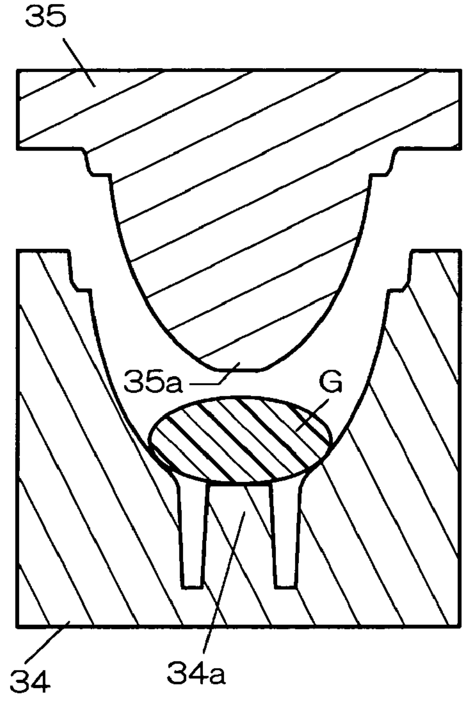
Fig. 6(a) prior art
FIG. 6(*a*)-6(*d*) are explanatory views showing the conventional method.
Figure 6B:
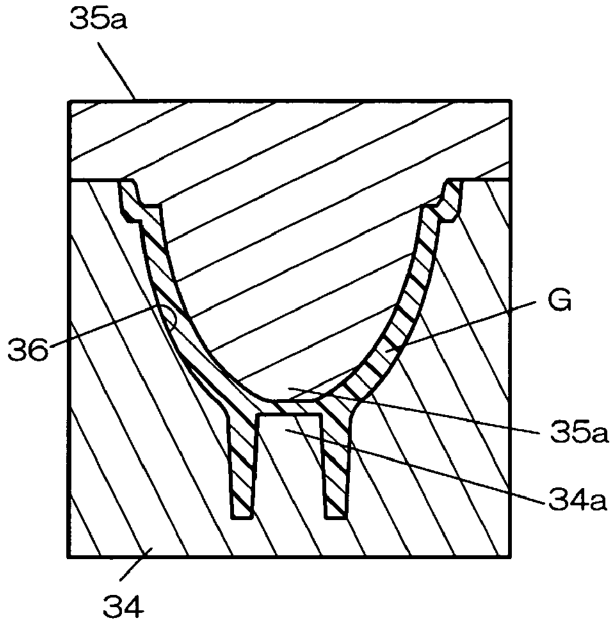
Fig. 6(b) prior art
Figure 6C:
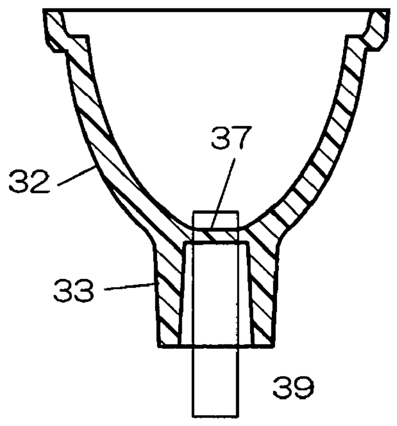
Fig. 6(c) prior art
Figure 6D:
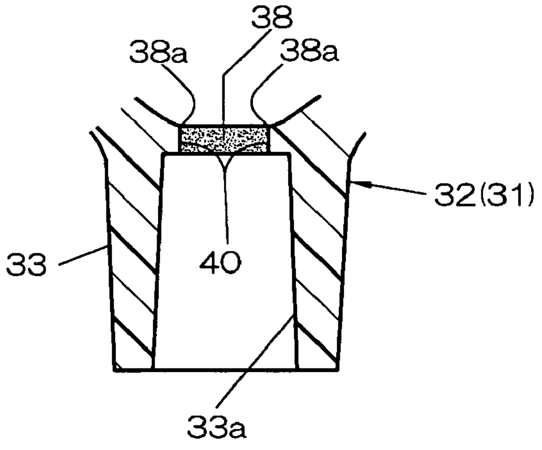
Fig. 6(d) prior art
Figure 7:
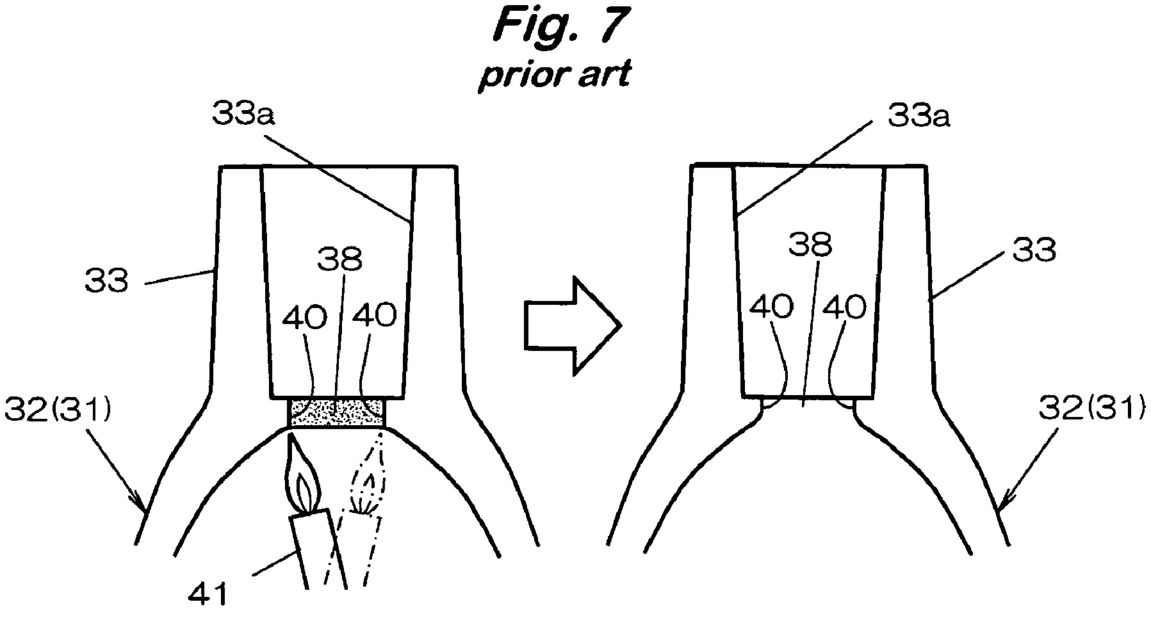
Fig. 7 prior art
FIG. 7 is an explanatory view showing the conventional method for removing scratches of narrowest portion.

FIGS. 3 and 4 are a sectional view and an enlarged sectional view of the main part, respectively, of a lump unit using the reflector manufactured by the present invention. The discharge lamp unit of this embodiment comprises the reflector 1 and the short arc discharge lamp 2 made from the quartz arc tube which is arranged on the center axis of reflector 1. In the bulb 21*a* formed in the center of a discharge lamp 2, a pair of electrodes 22*a* and 22*b* are sealed along the optical axis, and, starting gas and luminescence substance such as mercury are enclosed. The discharge lamp 2 has seal portions 2*a* and 2*b* which buried the molybdenum foil 23*a* and 23*b* in the both ends of the bulb 21*a*. To a seal portion 2*a* of one of them, the base 25 which has a main body 25*a* and screw part 25*b* of the end is attached.

The narrowest portion 6 of the diameter of inner which can insert seal part 2*a* of a discharge lamp 2 is formed in the insertion hole 4. The portion from reflective surface 1*a* to the posterior extremity of a narrowest portion 6 is shaped by the slope 8 of which surface is a molding surface. This slope 8 is the smooth surface which has maintained the molding surface without a defect of forming by the metallic mould, as it is, not by cutting or grinding.

Cylinder portion 19 of the insertion hole 4 of hollow neck portion 5 has sufficient inner diameter which can insert the base 25, and in which position-adjustment of lamp 2 is possible when the electrodes 23*a* and 23*b* were arranged with axis deviation at the time of lamp manufacture. They are arranged so that the main axis of a reflecting mirror 1 and the optical axis of the lamp 2 are in agreement. Then, base 25 is inserted to the cylinder portion 19 of hollow neck portion 5, and the cylinder-portion 19 is filled up with adhesives 26.

Thus, the lamp 2 is fixed to reflector 1. In this case, because insertion hole 4 is partitioned between the cylinder portion 19 and the slope 8 by the narrowest portion 6, the adhesives 26 poured into the cylinder portion 19 are dammed up by narrowest portion 6, and cannot flow into the reflective surface 1*a* side easily. Incidentally, in the case where the shape of the cross section of the cylinder portion of the base to be inserted into the insertion hole is a hexagon for making it difficult to turn around after fixing, similar effects can be obtained.

Owing to the said structure, even if the temperature around the light source apparatus used in a liquid crystal projector becomes high with the aim of downsizing of the light source apparatus, there is no chance that any cracks are produced from the glass working portion on the inner surface of the hollow portion 5 of a reflecting mirror 1 as in the prior art, and the life characteristic can be improved.

For example, in case of using an apparatus of which optical axis is arranged in horizontal position, a position where the temperature of the reflecting mirror is highest is a position H in FIG. 1. Although the temperature of the position H of the reflector is about 480° C. lower than the glass distortion temperature of 520° C., the conventional reflecting mirror cracks from the periphery of the portion of the grinding surface after repeating lighting.

On the other hand, in the reflector 1 of a present invention, the portion from back end of narrowest portion 6 to reflective surface 1*a* is formed by a slope 8 made from a mold surface, and does not have a defect by cutting. Therefore, even if it becomes the temperature about 500 degrees C. at the time of lighting, a crack does not occur during the life period of the lamp, when the reflector 1 is made from the glass of the same composition.

A reflector 1 and a lamp 2 is fixed by pouring the adhesives 26, of which silica and alumina are the main components, from the back opening of hollow neck portion 6, after position adjustment is carried out. The adhesives 26 are dammed up by narrow portion 6 and does not flow into reflective surface 1*a*. Therefore, adhesives 26 do not adhere to the slope 8 and reflective surface 1*a* used under high temperature. The crack caused by the stress produced according to the thermal expansion difference between reflector 1 made from glass and adhesives 26 is prevented.

INDUSTRIAL APPLICABILITY

5941 A present invention is applicable to the use of manufacturing the glass reflector used for the lamp unit of a light source apparatus.

The invention claimed is:

1. A method of manufacturing a reflector which has a hollow neck portion which fixes an end of a lamp to an outside of the bottom of the reflector along an optical axis of the reflector, the method comprising:

a molding process in which an inner mould and an outer mould are used, the inner mould forming an inner surface of the reflector and having a nipple at a point to form a dent in the direction of the hollow neck portion having a smooth slope from the bottom of the reflector, the outer mould forming an outer surface of the reflector and having a core projection facing the nipple of the inner mould to form the hollow neck portion, wherein a cavity formed between the outer mould and the inner mould is filled with glass by pressing a glass-gob placed in the outer mould, and forming a reflector body;

a grinding process wherein the hollow neck portion is ground until a partition portion formed between the core projection of the outer mould and the nipple of the inner mould is around away so as to form an opening between the hollow neck portion and the inner surface of the reflector; and a reflective membrane covering process the reflector body is covered with a reflective membrane, wherein, during said grinding process, opening of the partition portion is carried out by grinding the inside of the hollow neck portion so that an inner diameter of a backside of the hollow neck portion becomes larger than an outer diameter of the nipple portion, wherein, after the partition portion is ground away, an area previously occupied by the ground away partition portion comprises at least a portion of the hollow neck portion.

2. The method of manufacturing a reflector of claim 1, wherein said grinding process includes grinding with a grindstone having a larger diameter than the nipple.

3. The method of manufacturing a reflector of claim 2, wherein the grindstone grinds the inside of the hollow neck portion without engaging the dent formed by the nipple.

4. The method of manufacturing a reflector of claim 3, further comprising providing the reflector with a slope extending from a narrowest portion of the opening and diverging towards a reflective surface of the reflector body.

5. The method of manufacturing a reflector of claim 1, wherein the end of the lamp is fixed by pouring an adhesive from the backside of the hollow neck portion.

* * * * *